US008534498B2

(12) United States Patent
Campbell et al.

(10) Patent No.: US 8,534,498 B2
(45) Date of Patent: Sep. 17, 2013

(54) FLUSH UNIT FOR A FOUNTAIN DISPENSER

(76) Inventors: Steven Wayne Campbell, New Albany, IN (US); Charles Ernest Smith, Jr., Springdale, WA (US)

(*) Notice: Subject to any disclaimer, the term of this patent is extended or adjusted under 35 U.S.C. 154(b) by 178 days.

(21) Appl. No.: 13/114,369

(22) Filed: May 24, 2011

(65) Prior Publication Data

US 2011/0290336 A1 Dec. 1, 2011

Related U.S. Application Data

(60) Provisional application No. 61/348,199, filed on May 25, 2010.

(51) Int. Cl.

| | |
|---|---|
| ***B67B 7/00*** | (2006.01) |
| ***G01F 11/00*** | (2006.01) |
| ***B67D 1/08*** | (2006.01) |
| ***B67D 7/74*** | (2010.01) |
| ***F15B 13/00*** | (2006.01) |

(52) U.S. Cl.
USPC ............. 222/1; 222/129.1; 222/148; 137/271

(58) Field of Classification Search
USPC ................... 222/129.1, 148, 1; 134/34, 94.1, 134/198; 137/15.05, 237, 238, 271, 884
See application file for complete search history.

(56) References Cited

U.S. PATENT DOCUMENTS

| | | | | |
|---|---|---|---|---|
| 3,934,605 | A * | 1/1976 | Legris | 137/271 |
| 4,392,677 | A * | 7/1983 | Hardouin | 285/124.5 |
| 4,592,490 | A * | 6/1986 | McMichael | 222/129.1 |
| 4,619,378 | A * | 10/1986 | de Man | 222/144.5 |
| 5,685,458 | A * | 11/1997 | Durham et al. | 222/129.1 |
| 5,884,813 | A * | 3/1999 | Bordonaro et al. | 222/129.1 |
| 5,954,235 | A * | 9/1999 | Schroeder et al. | 222/129.1 |
| 6,286,721 | B1 * | 9/2001 | Pellegrini | 222/129.1 |
| 6,705,489 | B2 * | 3/2004 | Henry et al. | 222/129.1 |
| 2005/0230421 | A1 * | 10/2005 | Morrow et al. | 222/132 |

* cited by examiner

*Primary Examiner* — Paul R Durand
*Assistant Examiner* — Vishal Pancholi
(74) *Attorney, Agent, or Firm* — Steven N. Fox, Esq.

(57) ABSTRACT

The present invention is a flush unit that can quickly and safely connect to a conventional soda fountain dispenser for cleaning the drain system of the dispenser. The flush unit comprises a one-piece unitary flush block or housing, a flexible hose, and a nozzle. The flush block comprises a fluid conduit having a water inlet port and a water outlet port. The flush block further comprises a plug port for plugging the syrup outlet port of a conventional back block. The water inlet and plug ports are spaced to engage with the water and syrup outlet ports, respectively, of the back block. The flush block further comprises a fastener adapted to engage with a fastener of the back block. The flexible hose has a first end connected by a fastener to the water outlet port of the flush block and a second end connected to the nozzle. The present invention allows a person to quickly connect the flush unit to a conventional dispenser and flush the drain system of the dispenser using its own hydrostatic water source. The present invention eliminates the need for carrying independent pressurized Co2/air flushing tanks.

19 Claims, 9 Drawing Sheets

FLUSH UNIT FOR A FOUNTAIN DISPENSER

CROSS-REFERENCE TO RELATED APPLICATIONS

This application claims priority to U.S. Provisional Application Ser. No. 61/348,199 filed on May 25, 2010, which is hereby incorporated by reference into this specification in its entirety.

BACKGROUND OF THE INVENTION

The present invention relates to devices, systems, and methods for cleaning commercial soda fountains and other dispensing machines. Over time, drain hoses of fountain dispenser become clogged leading to an undesired overfill of the drain reservoir and spillage of fluid. Conventional cleaning devices consist of a hose connected to a tank of carbon dioxide (Co2). Although providing adequate cleaning with high pressure, such conventional devices are heavy and require transportation of the tank to and from the location of the fountain dispenser. Transporting and handling of heavy tanks presents significant safety concerns especially with Co2 inside service vehicles.

SUMMARY OF THE INVENTION

In one embodiment, the present invention is a flush unit that can quickly and safely connect to a conventional soda fountain dispenser for cleaning the drain system of the dispenser. The flush unit comprises a one-piece unitary flush block or housing, a flexible hose, and a nozzle. The flush block comprises a fluid conduit having a water inlet port and a water outlet port. The flush block further comprises a plug port for plugging the syrup outlet port of a conventional back block. The water inlet and plug ports are spaced to engage with the water and syrup outlet ports, respectively, of the back block. The flush block further comprises a fastener adapted to engage with a fastener of the back block. The flexible hose has a first end connected by a fastener to the water outlet port of the flush block and a second end connected to the nozzle. The present invention allows a person to quickly connect the flush unit to a conventional dispenser and flush the drain system of the dispenser using its own hydrostatic water source. The present invention eliminates the need for carrying independent pressurized Co2/air flushing tanks.

BRIEF DESCRIPTION OF THE DRAWINGS

The following description of the invention will be more fully understood with reference to the accompanying drawings in which.

DESCRIPTION OF THE INVENTION

Figure 1:
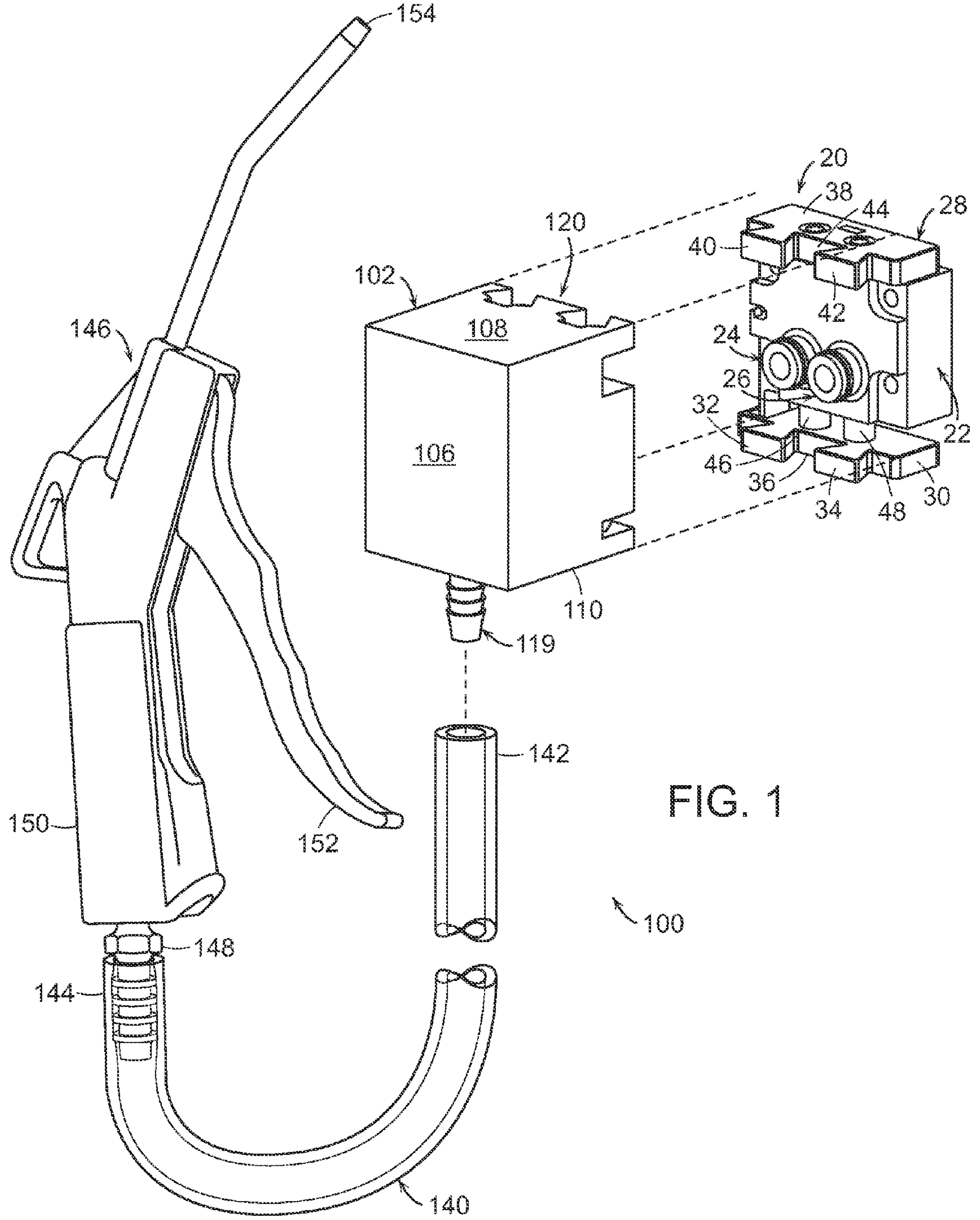
FIG. 1 is an exploded view of a first embodiment of a flush unit according to the present invention for use with a first type of conventional fountain dispenser (not shown)
Figure 2:
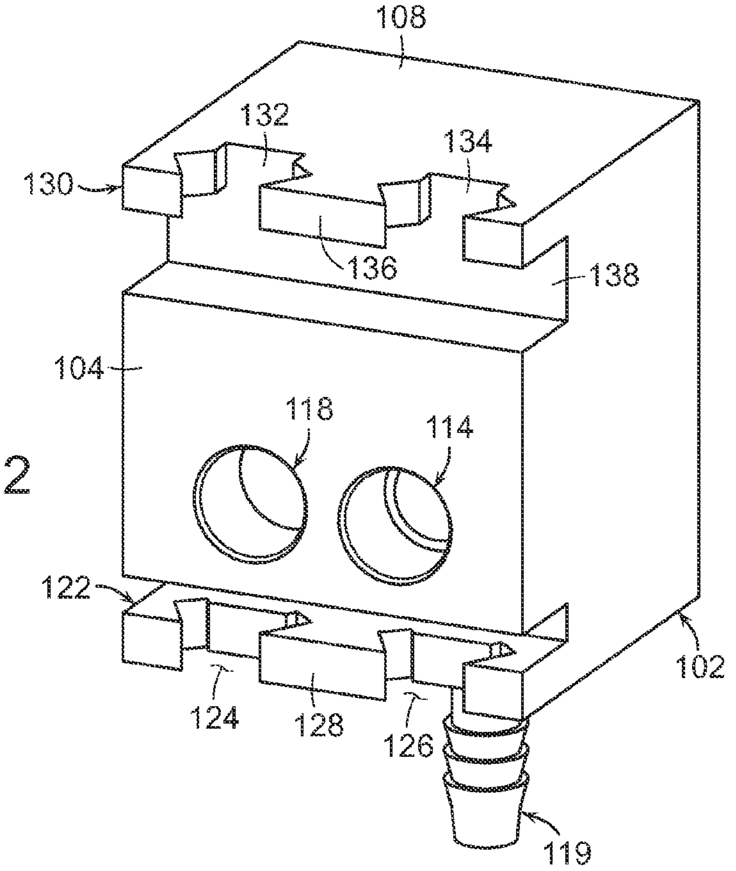
FIG. 2 is a perspective view of the flush block.
Figure 3:
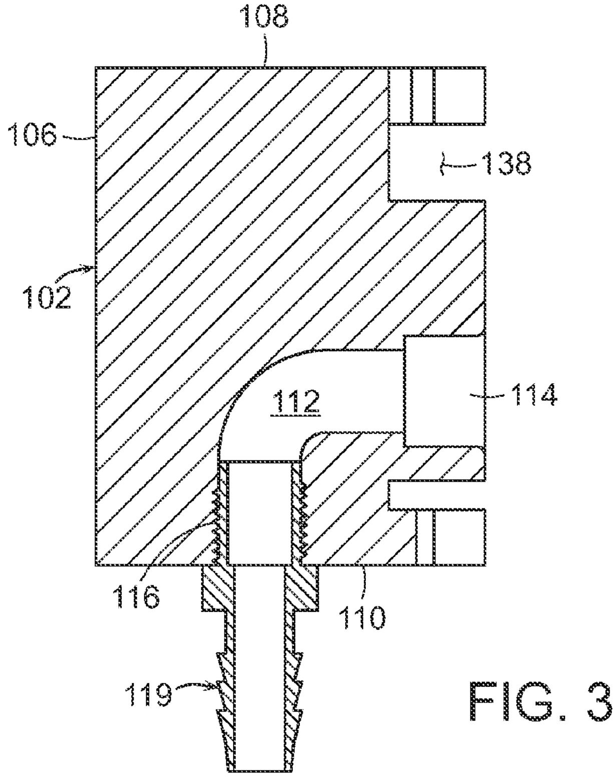
FIG. 3 is a cross-section view of the flush block.

Referring to FIGS. 1-5, the present invention is a flush unit 100 that can be quickly connected to a back block 20 of a first type of commercial soda fountain dispenser (not shown) for cleaning the drain system of the dispenser.

Back block 20 has a housing 22 and water and syrup outlet portions 24 and 26 that provide pressured carbonated water and syrup, respectively, from the dispenser (not shown). Back block 20 has a fastener 28 that removably engages and/or receives a fastener 120 (to be described) of flush unit 100. Fastener 28 has lower and upper flanges 30 and 38 connected by posts 46 and 48. Posts 46 and 48 slide upward and downward within a pair of spaced bores (not shown) of housing 20. Lower flange 30 has male fingers 32 and 34, and a female notch 36. Upper flange 38 has male fingers 40 and 42, and a female notch 44.

Flush unit 100 generally comprises a one-piece unitary flush block or housing 102, a flexible hose 140, and a nozzle 146. Flush block 102 comprises a front face 104, a rear face 106, a top face 108, and a bottom face 110. Front face 104 is substantially perpendicular to bottom face 110. Flush block 102 further comprises a fluid conduit 112 extending substantially from front face 104 to bottom face 110. Flush block 102 further comprises a water inlet port 114 in communication with fluid conduit 112 and a plug port 118 extending inward from front face 104. Flush block 102 further comprises a threaded water outlet port 116 extending inward from bottom face 110. Flush block 102 further comprises a barbed fitting 119 connected by threads to water outlet port 116. Water inlet port 114 and plug port 118 are spaced to engage with water and syrup outlet ports 24 and 26, respectively, of back block 20. Plug port 118 operates to seal or otherwise shut-off or plug syrup outlet port 26 of back block 20 during use of flush unit 100.

Figure 4:
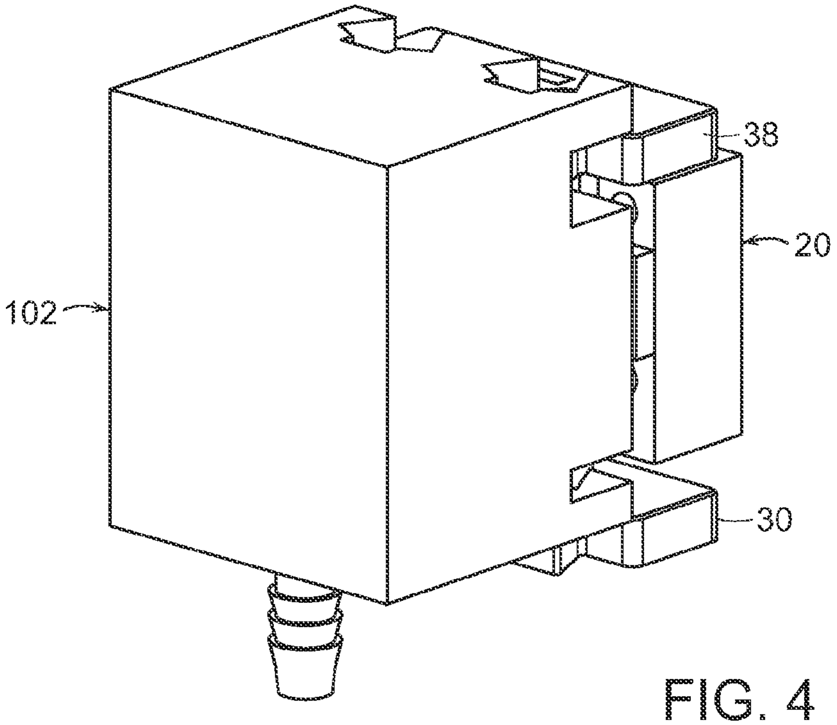
FIG. 4 is a perspective view of the flush block partially engaged with a back block of the first conventional fountain dispenser.
Figure 5:
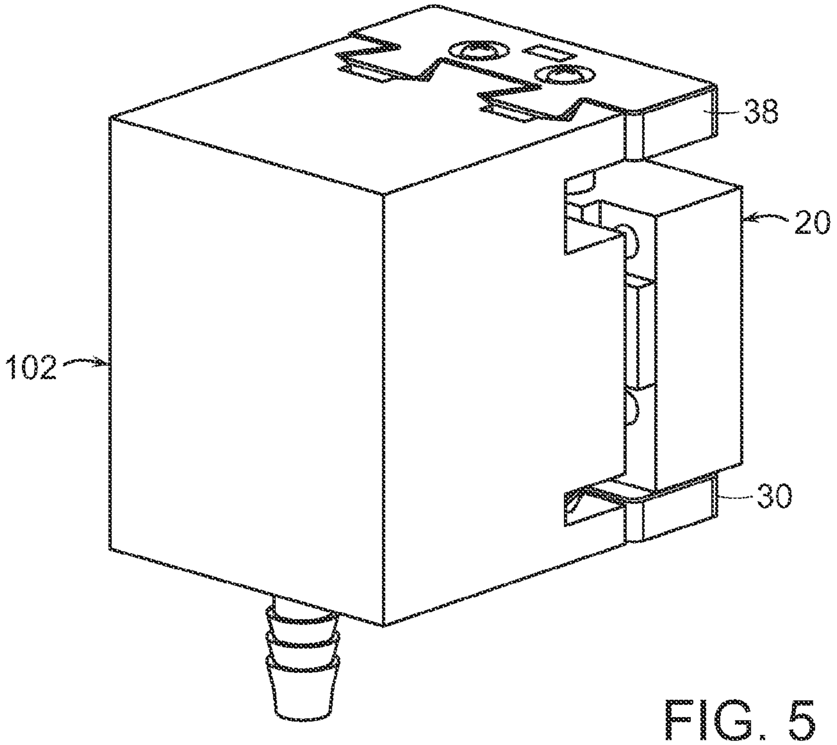
FIG. 5 is a perspective view of the flush block fully engaged with the back block of the first conventional fountain dispenser.

Flush block 102 further comprises a fastener 120 adapted to engage with fastener 28 of back block 20. Fastener 120 comprises a lower flange 122, an upper flange 130, and an elongated recess 138. Lower flange 122 has female notches 124 and 16, and a male finger 128 disposed between female notches 124 and 126. Similarly, upper flange 130 has female notches 132 and 134, and a male finger 136 disposed between females notches 124 and 126. Flush block 102 may be engaged with back block 20 by mating water inlet port 144 of flush block 102 with water outlet port 24 of back block 20. As shown in FIG. 4, complete mating of water inlet port 144 with water outlet port 24 causes male fingers 32 and 34 and female notch 36 of fastener 28 to slide into elongated recess 138. As shown in FIG. 5, to lock flush block 102 to back block 20, lower and upper flanges 122 and 130 are moved upward about posts 46 and 48 to a position where: (1) female notches 124 and 126 of lower flange 122 are engaged with male fingers 32 and 34, respectively, of lower flange 30 of back block 20, and male finger 128 of lower flange 122 is engaged with female notch 36 of back block 20, and (2) female notches 132 and 136 of upper flange 130 are engaged with male fingers 40 and 42, respectively, of upper flange 38 of back block 20, and male finger 136 of upper flange 130 is engaged with female notch 44 of upper flange 38 of back block 20. To disengage flush block 102 from back block 20, lower and upper flanges 122 and 130 are moved downward to a position where lower and upper flanges 122 and 130 are clear of lower and upper flanges 30 and 38, respectively, of back block 20. Thereafter, flush block 102 may be removed from back block 20. Flush block 202 may be made from conventional materials such as plastic and fabricated by conventional molding and/or machining processes.

Flexible hose 140 has first and second ends 142 and 144. First end 142 is engaged with water outlet port 116 of flush block 102. Second end 144 is connected with an inlet port 148 (to be described) of nozzle 146. Flexible hose 140 is well known and widely available.

Nozzle 146 has an inlet port 148, a handle, 150, a lever 152, and an outlet port 154. Inlet port 148 is connected to second end 144 of flexible hose 140. Depression of lever 152 causes carbonated water supplied by back block 20 to be dispensed from outlet port 154. Nozzle 146 is well known and widely available.

In operation, a person would disconnect the existing dispenser (not shown) from back block 20 at the fountain (not shown) located, for example, in a restaurant. Then, the person may connect flush block 102 to back block 20 and operate nozzle 146 to flush the drain system of the fountain using its own pressurized carbonated water source. The present invention eliminates the need for carrying independent Co2/air tanks which can cause injury especially when transported in a service vehicle.

The present invention is also a method of flushing or cleaning a drain system (not shown) of a soda fountain (not shown) having at least one dispenser (not shown) engaged with back block 20. In one embodiment, the method comprises a step of removing the dispenser (not shown) from back block 20. The method comprises a further step of providing a flush unit 100 having a flush block 102 connected with a nozzle 146. The method comprises a further step of connecting flush block 102 to back block 20. The method comprises a further step of locking flush block 102 to back block 20. The method comprises a further step of directing and/or inserting nozzle 146 at and/or into the drain system (not shown) of the soda fountain (not shown). The method comprises a further step of activating nozzle 146 thereby forcing carbonated water supplied by back block 20 thru the drain system of the soda fountain. The method comprises a further step of unlocking flush block 102 from back block 20. The method comprises a further step of removing flush block 102 from back block 20.

Referring to FIGS. 6-9, where a second embodiment of a flush unit 200 according to the present invention is shown for use with a back block 50 of a second type of soda fountain dispenser (not shown).

Similar to back block 20, back block 50 has a housing 52 and water and syrup outlet ports 54 and 56. Back block 50 has a fastener 58 that removably engages and/or receives a fastener 220 (to be described) of a flush block 202 (to be described). In the embodiment shown, fastener 58 comprises left and right flanges or bosses 64 and 66 positioned adjacent water outlet port 54 and syrup outlet port 56, respectively. Fastener 58 further comprises holes 56 and 58 passing thru left and right flanges 60 and 64, respectively.

Flush unit 200 generally comprises a one-piece unitary flush block or housing 202, a flexible hose 140 (previously described), and a nozzle 146 (previously described). Flush block 202 comprises a front face 204, a rear face 206, a top face 208, and a bottom face 210. Front face 204 is substantially perpendicular to bottom face 210. Flush unit 200 further comprises a fluid conduit 212 formed within flush block 202 extending from front face 204 to bottom face 210. Flush block 202 further comprises a water inlet port 214 and a plug port 218 extending inward from front face 204. Flush block 202 further comprises a threaded water outlet port 216 and a barbed fitting 219 threaded therewith and extending outward from bottom face 110. Water inlet port 114 and plug port 118 are spaced to engage with water and syrup outlet ports 54 and 56, respectively, of back block 50. Plug port 218 operates to plug syrup outlet port 56 of back block 50 during use of flush unit 200.

Figure 6:
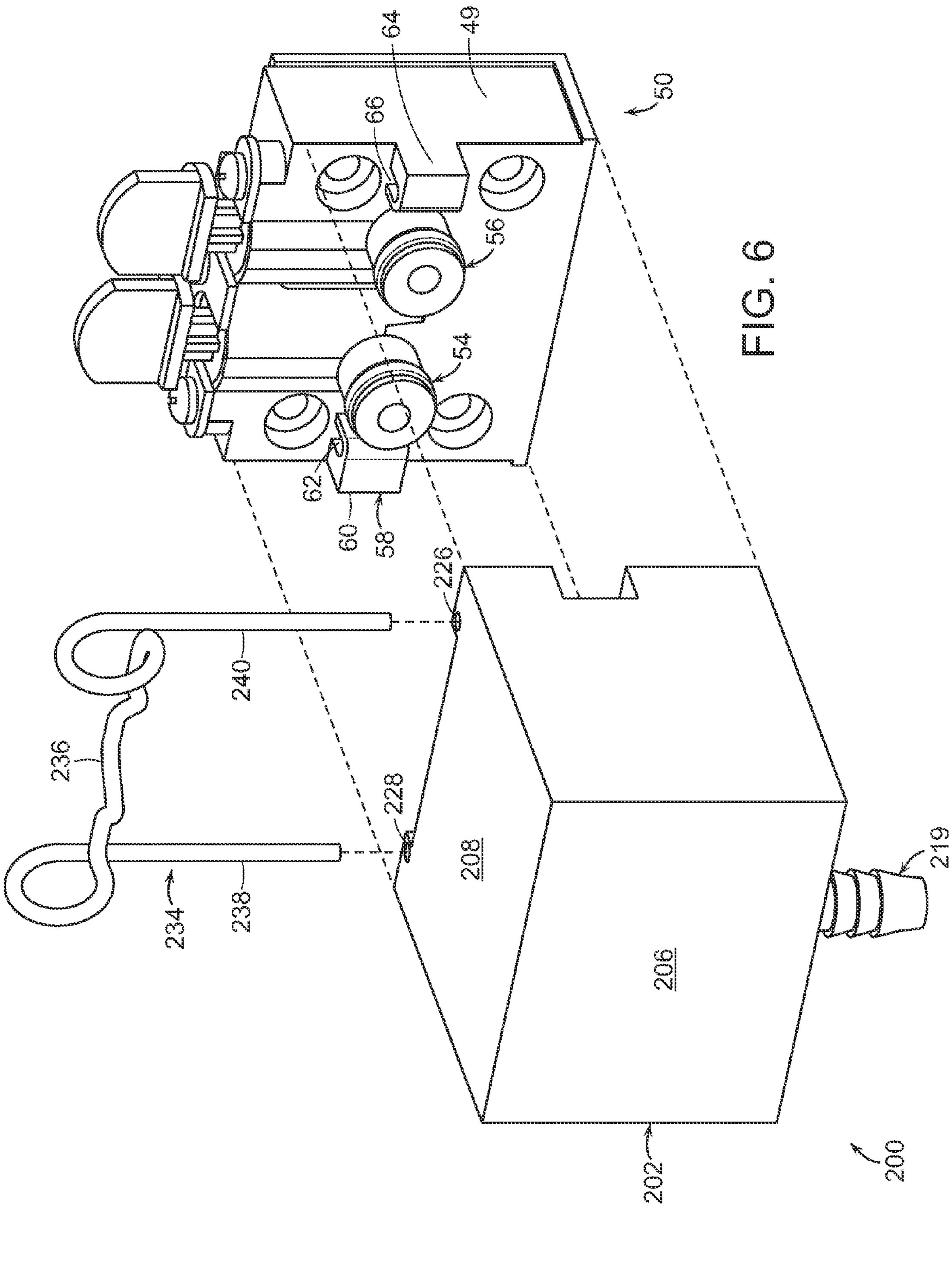
FIG. 6 is an exploded view of a second embodiment of a flush unit according to the present invention for use with a second type of conventional fountain dispenser (not shown)
Figure 7:
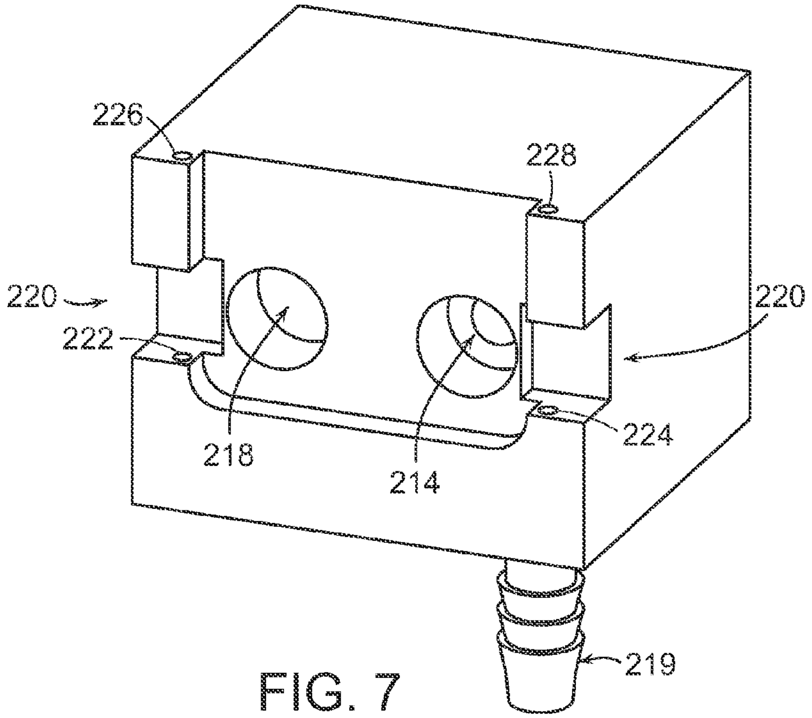
FIG. 7 is a perspective view of the flush block.
Figure 8:
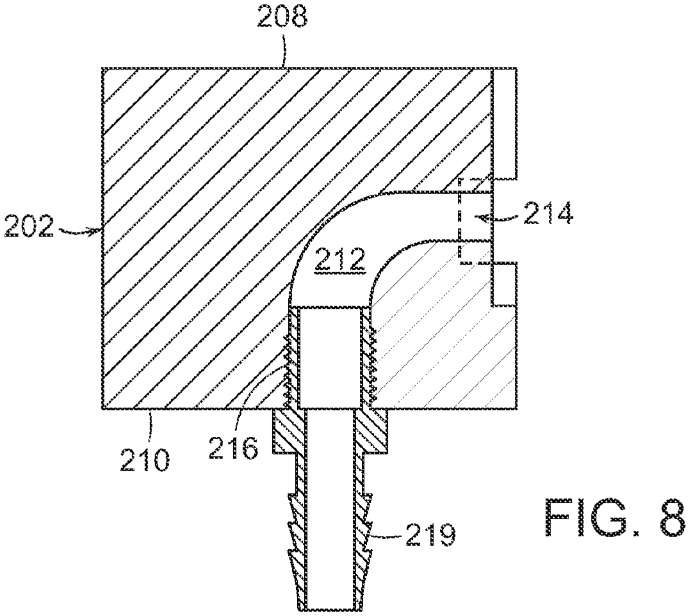
FIG. 8 is a cross-section view of the flush block.
Figure 9:
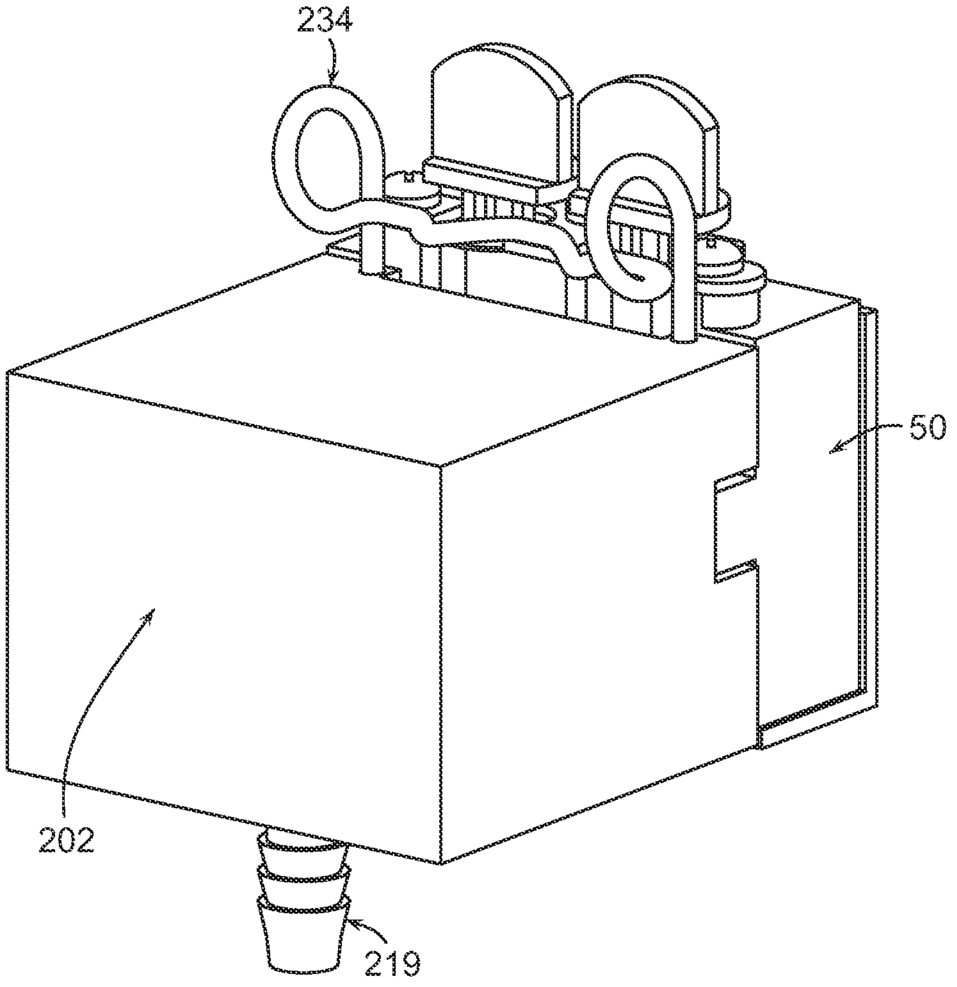
FIG. 9 is a perspective view of the flush block fully engaged with a back block of the second conventional fountain dispenser.
Figure 10:
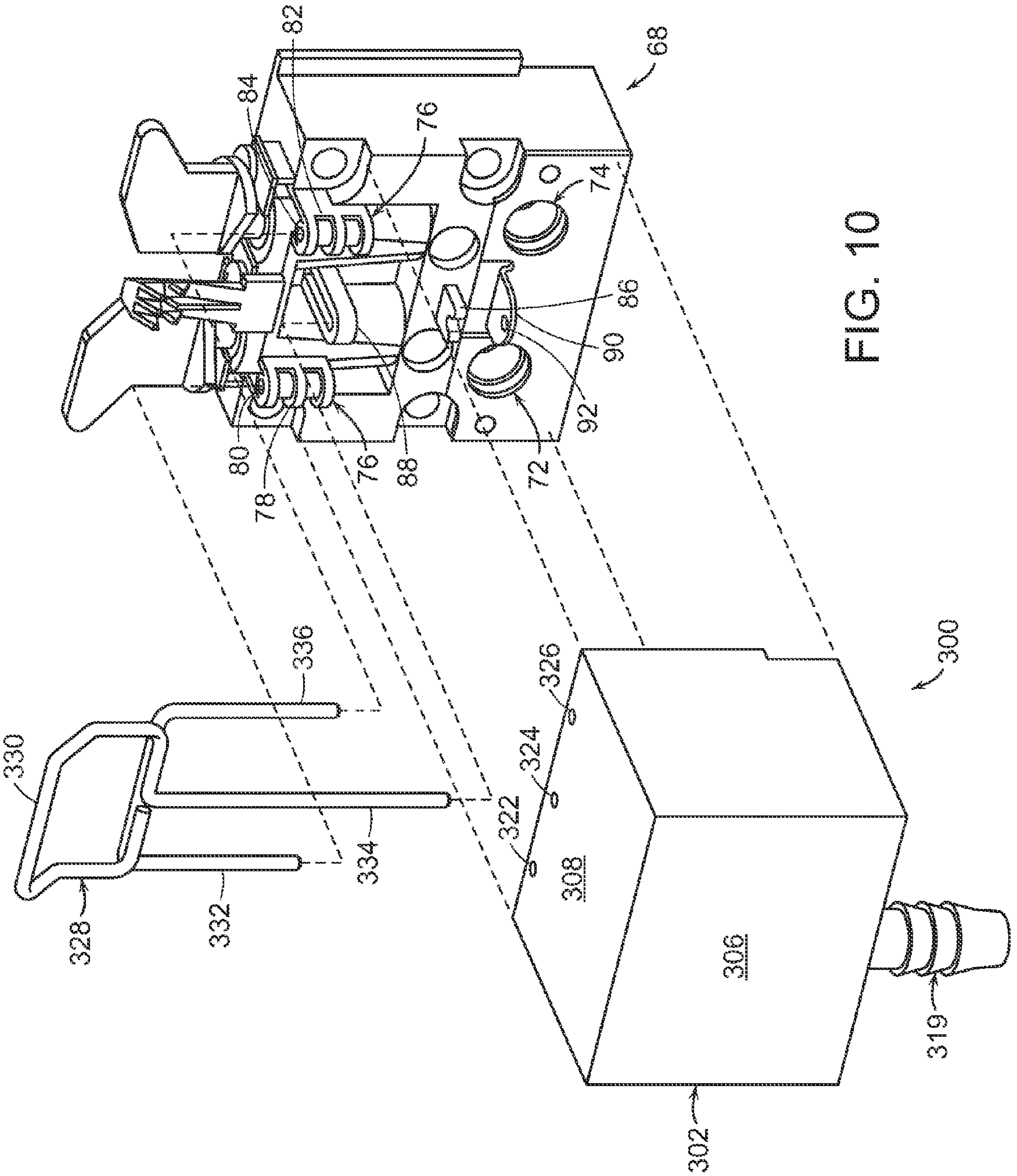
FIG. 10 is an exploded view of a third embodiment of a flush unit according to the present invention for use with a third type of conventional fountain dispenser (not shown)
Figure 11:
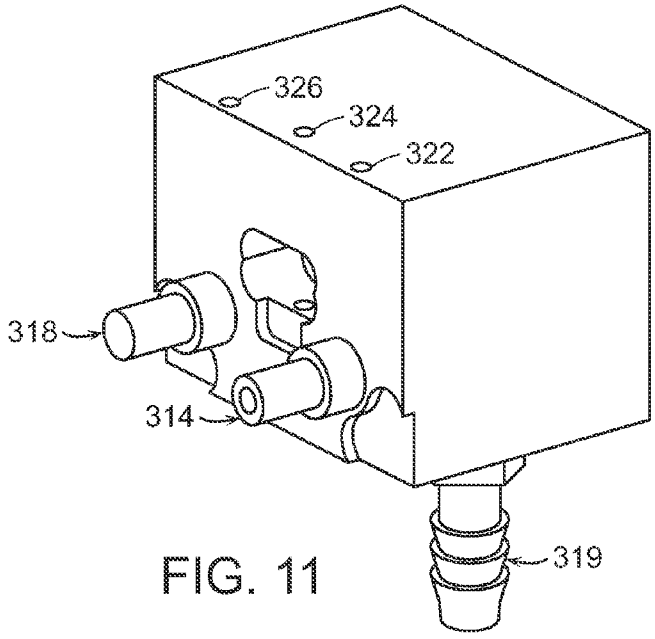
FIG. 11 is a perspective view of the flush block.
Figure 12:
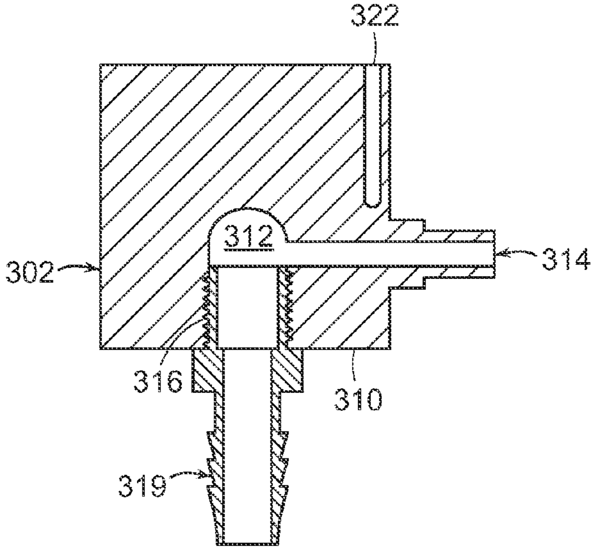
FIG. 12 is a cross-section view of the flush block.

Flush block 202 further comprises a fastener 220 adapted to engage with fastener 54 of back block 48. Fastener 220 comprises a pair of lower holes 222 and 224 positioned at opposite sides of flush block 202. Fastener 220 further comprises a pair of lower holes 222 and 224 positioned at opposite sides of flush block 202. Fastener 220 further comprises left and right recesses 222 and 224 positioned at opposite sides of flush block 202 and above holes 222 and 224. Fastener 220 further comprises a pair of upper holes 226 and 228 positioned at opposite sides of flush block 202 and above left and right recesses 222 and 224. Upper holes 226 and 228 are aligned with lower holes 222 and 224, respectively. Fastener 220 further comprises a locking pin 234 having a handle 236 and first and second elongated legs 238 and 240. As shown in FIGS. 6 and 9, flush block 202 may be engaged with back block 50 by mating water inlet port 214 of flush block 202 with water outlet port 50 of back block 50 causing left and right flanges 60 and 62 of back block 50 to engage with left and right recesses 230 and 232, respectively, of flush block 202. Legs 238 and 240 of locking pin 234 may be inserted into upper holes 226 and 228, respectively, of flush block 202; holes 62 and 66 of back block 50; and lower holes 222 and 224, respectively, of flush block 202.

Referring to FIGS. 10-13, where a third embodiment of a flush unit 300 according to the present invention is shown for use with a back block 68 of a third type of conventional fountain dispenser (not shown). Similar to back blocks 20 and 50, back block 68 comprises a housing 70 having water and syrup outlet ports 72 and 74. Back block 68 further comprises a fastener 76 that removably engages and/or receives a fastener 320 (to be described) of flush block 300. In the embodiment shown, fastener 76 comprises left and right flanges or bosses 78 and 82 positioned above water outlet port 72 and syrup outlet port 74, respectively. Fastener 76 further comprises holes 80 and 84 passing thru left and right flanges 78 and 82, respectively. Fastener 76 further comprises lower and upper guides 86 and 88. Fastener 76 further comprises a lower flange 90 having a hole 92.

Flush unit 200 generally comprises a one-piece unitary flush block or housing 302, a flexible hose 140 (previously described), and a nozzle 146 (previously described). Flush block 302 comprises a front face 304, a rear face 306, a top face 308, and a bottom face 310. Front face 304 is substantially perpendicular to bottom face 310. Flush block 302 further comprises a fluid conduit 312 formed within flush block 302 extending from front face 304 to bottom face 310. Flush block 302 further comprises a water inlet port 314 and a plug port 318 extending outward from front face 304. Flush block 302 further comprises a threaded water outlet port 316 and a barbed fitting 319 threaded thereto and extending outward from bottom face 310. Water inlet port 314 and plug port 318 are spaced to engage with water and syrup outlet ports 72 and 74, respectively, of back block 68. Plug port 318 operates to plug syrup outlet port 74 of back block 68 during use of flush unit 300.

Figure 13:
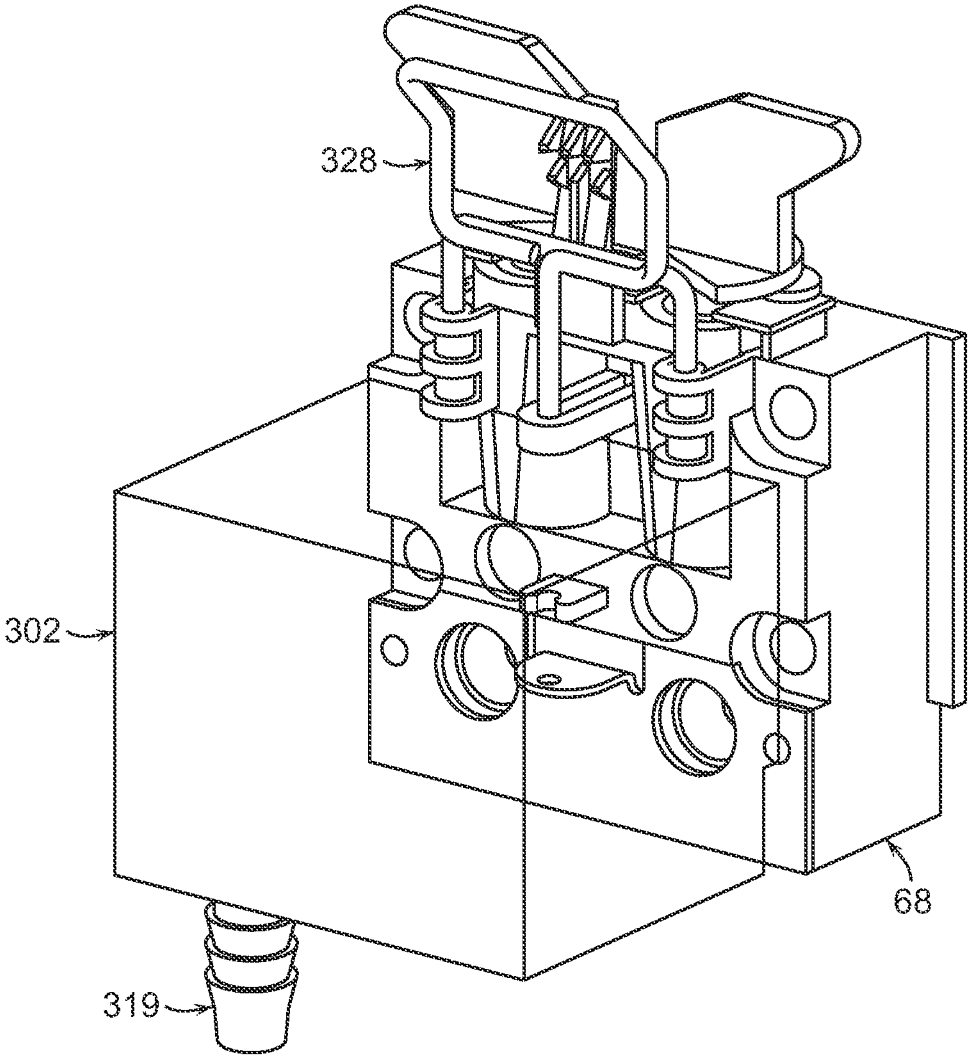
FIG. 13 is a perspective view of the flush block fully engaged with a back block of the third conventional fountain dispenser.

Flush block 302 further comprises a fastener 320 adapted to engage with fastener 76 of back block 68. Fastener 320 comprises first, second, and third holes 322, 324, and 326 extending inward from top face 308 of flush block 302. Flush block 302 may be engaged with back block 68 by mating water inlet port 314 of flush block 302 with water outlet port 72 of back block 68 causing left and right flanges 78 and 82 and upper guide 88 of back block 68 to be adjacent to and aligned with holes 322, 324, and 326, respectively, of flush block 302. As shown in FIG. 13, a person may insert legs 332, 334, and 336 of locking pin 328 into holes 322, 324, and 326, respectively, of flush block 302.

Flush units 100, 200 and 300 have been described with reference to back blocks of conventional beverage fountain dispensers. However, the present invention may be used with any type of fountain and/or liquid dispenser having its own water source.

The embodiments and illustrative details set forth should merely be regarded as descriptive disclosure. Various other changes and additions obvious to those skilled in the art are within the spirit and scope of the claimed invention.

What is claimed:

1. A flush unit for mounting to a back block of a fountain dispenser, the back block having water and syrup outlet ports and a fastener; the flush unit comprises:

a one-piece unitary flush block comprising a fluid conduit having a water inlet port and a water outlet port; said flush block further comprising a plug port; said water inlet and plug ports being spaced to engage with the water and syrup outlet ports, respectively, of the back block; said flush block further comprises a fastener adapted to engage with the fastener of the back block;

a flexible hose comprising first and second ends; said first end is engaged with said water outlet port of said flush block; and a nozzle engaged with said second end of said flexible hose.

2. The flush unit of claim 1, wherein said fastener comprises a pair of lower angular shaped female notches disposed below said water inlet port and said plug port.

3. The flush unit of claim 2, wherein said fastener further comprises a pair of upper angular shaped female notches disposed above said water inlet port and said plug port; said pair of lower notches are aligned said pair of upper notches.

4. The flush unit of claim 3, wherein said flush block further comprises a front face and a bottom face; said front face is substantially perpendicular to said bottom face.

5. The flush unit of claim 4, wherein said water inlet port and said plug port are disposed at said front face of said flush block.

6. The flush unit of claim 5, where said water outlet port is disposed at said bottom face of said flush block.

7. The flush unit of claim 6, wherein said flush unit further comprises a barbed fitting engaged with said water inlet port and extending outward from said bottom face.

8. The flush unit of claim 1, wherein said fastener comprises first and second lower holes disposed below said water inlet port and said plug port.

9. The flush unit of claim 8, wherein said fastener further comprises first and second upper holes disposed above said water inlet port and said plug port; said first and second upper holes are aligned with first and second lower holes.

10. The flush unit of claim 9, wherein flush block further comprises a front face and a bottom face; said front face is substantially perpendicular to said bottom face.

11. The flush unit of claim 10, where said water inlet port and said plug port are disposed at said front face of said flush block.

12. The flush unit of claim 11, where said water outlet is disposed at said bottom face of said flush block.

13. The flush unit of claim 12, wherein said flush block further comprises a barbed fitting engaged with said water outlet port of said flush block.

14. A portable device for mounting to a back block of a fountain dispenser, the back block having water and syrup outlet ports and a fastener; the device comprising: a one-piece unitary flush block removably engaged with the back block; said flush block comprises a fluid conduit having a water inlet port and a water outlet port; said flush block further comprises a plug port; said water inlet and plug ports being spaced to engage with the water and syrup outlet ports, respectively, of the back block; said flush block further comprises a fastener adapted to engage with the fastener of the back block; and said flush block further comprises a flexible hose comprising first and second ends; said first end is engaged with said water outlet port of said flush block.

15. The device of claim 14, further comprising a nozzle connected with said second end of said flexible hose.

16. A method of cleaning a drain system of a soda fountain having at least one dispenser engaged with a back block, the method comprising the steps of:

(a) removing the dispenser from the back block;

(b) providing a flush block with a nozzle;

(c) connecting the flush block to the back block;

(d) inserting the nozzle into the drain system of the soda fountain; and (e) activating the nozzle to force carbonated water supplied by the back block thru the drain system of the soda fountain.

17. The method of claim 16, further comprising the step of locking the flush block to the back block after step (c).

18. The method of claim 17, further comprising the step of unlocking the flush block to the back block after step (e).

19. The method of claim 18, further comprising the step of removing the flush block from the back block after unlocking the flush block from the back block.

* * * * *